(12) United States Patent
Sanada (10) Patent No.: US 7,959,158 B2
(45) Date of Patent: Jun. 14, 2011

(54) SHAFT SEAL DEVICE

(75) Inventor: Masamitsu Sanada, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 672 days.

(21) Appl. No.: 11/793,304

(22) PCT Filed: Dec. 16, 2005

(86) PCT No.: PCT/JP2005/023141
§ 371 (c)(1),
(2), (4) Date: Jun. 19, 2007

(87) PCT Pub. No.: WO2006/068047
PCT Pub. Date: Jun. 29, 2006

(65) Prior Publication Data
US 2008/0145254 A1    Jun. 19, 2008

(30) Foreign Application Priority Data

Dec. 20, 2004  (JP) ................... 2004-368138

(51) Int. Cl.
*F16J 15/32* (2006.01)
(52) U.S. Cl. .................. 277/551; 277/552; 277/571
(58) Field of Classification Search .................. 277/549, 277/551, 552, 562, 571
See application file for complete search history.

(56) References Cited

U.S. PATENT DOCUMENTS

| | | | | |
|---|---|---|---|---|
| 3,275,333 A * | 9/1966 | Scott et al. | ..................... | 277/565 |
| 3,682,488 A * | 8/1972 | Matsushima | ................. | 277/551 |
| 4,208,057 A * | 6/1980 | Messenger | .................... | 277/309 |
| 4,433,846 A * | 2/1984 | Romero et al. | ............... | 277/551 |
| 4,531,748 A * | 7/1985 | Jackowski | ..................... | 277/551 |
| 4,623,153 A * | 11/1986 | Nagasawa | ..................... | 277/551 |
| 4,906,009 A * | 3/1990 | Saitoh | .......................... | 277/349 |
| 5,004,248 A * | 4/1991 | Messenger et al. | ........... | 277/351 |
| 5,209,499 A * | 5/1993 | Ruff et al. | ...................... | 277/551 |
| 5,211,406 A * | 5/1993 | Katzensteiner | ............... | 277/351 |
| 5,522,600 A * | 6/1996 | Duckwall | ...................... | 277/402 |
| 5,582,412 A * | 12/1996 | Sabo Filho | .................... | 277/565 |
| 5,649,710 A * | 7/1997 | Kanda | ........................... | 277/371 |
| 6,726,212 B2 * | 4/2004 | Oldenburg | .................... | 277/353 |
| 2008/0007013 A1 * | 1/2008 | Sanada | ......................... | 277/549 |

FOREIGN PATENT DOCUMENTS

| | | |
|---|---|---|
| JP | 45-12494 | 6/1970 |
| JP | 3-86250 | 8/1991 |
| JP | 4-101021 | 9/1992 |
| JP | 5-83543 | 11/1993 |
| JP | 6-80062 | 11/1994 |

* cited by examiner

*Primary Examiner* — Shane Bomar
*Assistant Examiner* — Robert E Fuller
(74) *Attorney, Agent, or Firm* — Arent Fox, LLP (57) ABSTRACT

A shaft sealing device includes a seal assembly equipped with a fitting part having a fitting surface hermetically fittable within a hole defining surface of a housing and a rubber elastomer first seal lip extending inward from the fitting part and having a seal surface which seals a fluid inside an internal boundary thereof. A seal sleeve made of metal or resin material is equipped with a slide seal surface that is in slidable contact with the seal surface of the first seal lip. A concave rotor surrounds a seal surface region defined at a longitudinal end of the slide seal surface, and includes a close-contact fitting surface that is hermetically fitted to a rotary shaft. A discharge port defined by the rotor facilitates the sealed fluid being pushed back to the rotor in a direction extending away from the seal surface region.

5 Claims, 6 Drawing Sheets

FIG. 6
PRIOR ART

SHAFT SEAL DEVICE

TECHNICAL FIELD

CROSS-REFERENCE TO RELATED APPLICATION

This application is a National Stage entry of International Application No. PCT/JP2005/023141, filed Dec. 16, 2005, the entire specification claims and drawings of which are incorporated herewith by reference.

The present invention relates to a shaft seal device providing a seal in a clearance gap between a rotary shaft which is mounted in a bore of the housing and the bore. More particularly, the invention relates to a shaft seal device which prevents abrasion of a seal face and an opposed mating seal face from being caused by impurities included in a sealed fluid or impurities getting caught on the seal faces.

BACKGROUND ART

There is a shaft seal device as a prior art related to the present invention which seals a chemical fluid or the like. This shaft seal device is employed for providing a seal in a clearance gap on the periphery of a rotary shaft of various kinds of compressors or the like (see, for example, Japanese Laid-Open Patent Publication No. 2000-179702 (FIG. 1)). Action fluid which is used as a refrigerant medium for a compressor of automobiles or the like operates as a high pressure sealed fluid in the cavities disposed around the rotary shaft. Sealed fluid, not limited to the refrigerant medium, cannot prevent some impurities from being included during its circulatory action. These impurities, in particular, easily get caught onto the seal faces. Some particular chemical fluid may allow solidification of the impurities after getting caught to the seal faces. Further, the high pressure sealed fluid forces seal lips providing a seal against the sealed fluid in the circumference of a rotary shaft to press against the diameter surface of the rotary shaft. While rubber-made seal lips or resin-made seal lips receive a high pressure from sealed fluid while making a secure contact with the rotary shaft, a problem will arise in case of inclusion of impurities wherein the impurities attracted to the seal faces accelerate abrasion of the sliding seal faces.

Figure 6:
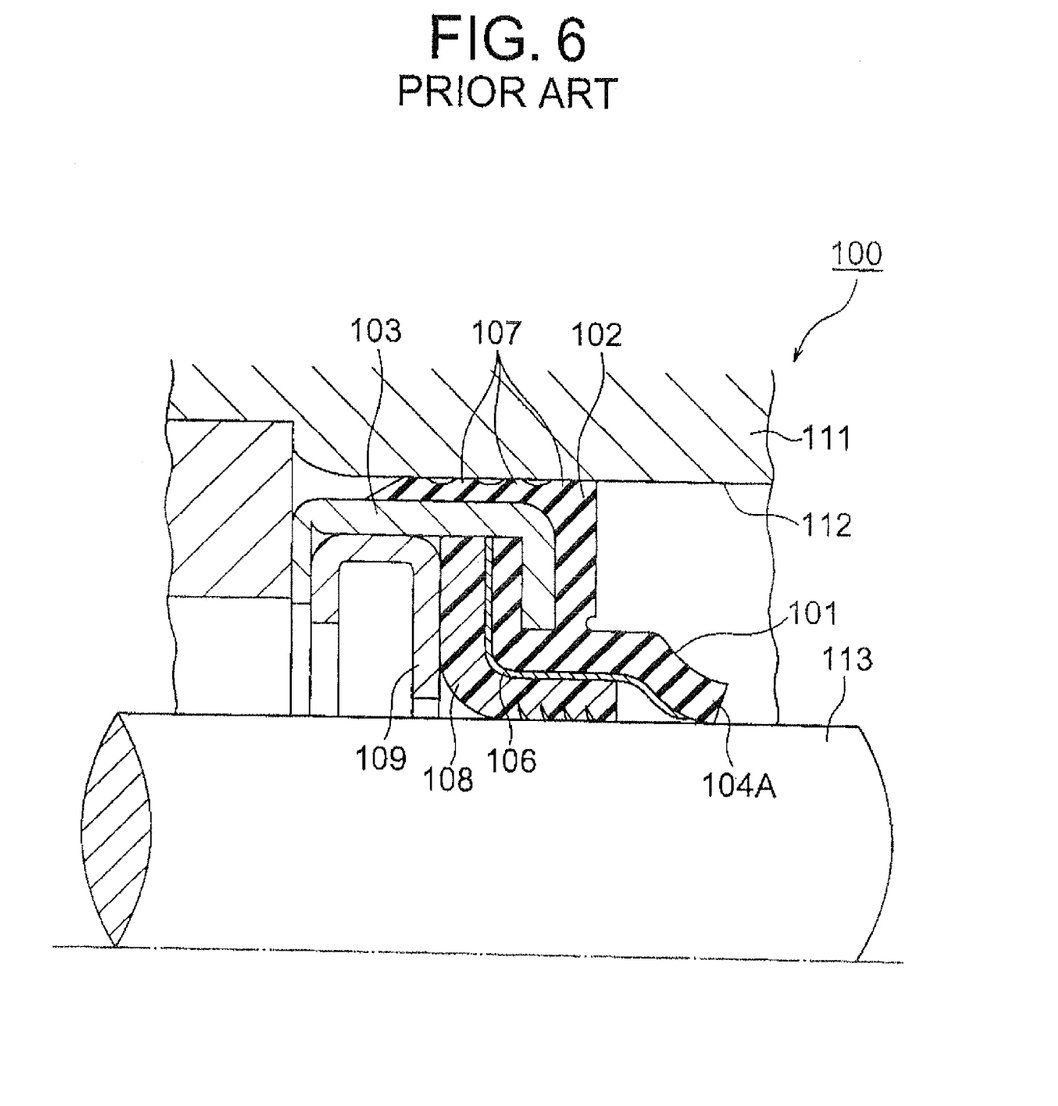
FIG. 6 is a cross sectional view of a half portion of a seal device as a prior art related to the present invention.

This shaft seal device 100 is constructed as shown in FIG. 6. FIG. 6 is a cross-sectional view of a half portion of the shaft seal device 100. The shaft seal device 100 includes a fit engagement member 102 of cylindrical design which has three undulated seal portions 107 along outer circumference thereof. The fit engagement member 102 disposes a reinforcement annulus 103 therewithin in an integral structure. The fit engagement member 102 is provided with reinforcement from the reinforcement annulus 103 so as to form a secure contact with a bore surface (hereafter simply referred to as a bore) 112 of housing 111. Also a first seal lip 101 extends from the fit engagement member 102 in radially inward a direction. In addition, there is disposed a resin-made second seal lip 108 in the external environment side (left side in the figure) with respect to the first seal lip 101. Between the rubber-made first seal lip 101 and the resin-made second seal lip 108 there is disposed a backup ring 106 which is made of thin sheet metal. The second seal lip 108 is secured by means of a fixture member 109 between the backup ring 106 and the fixture member 109. The first seal lip 101 made of rubber material is susceptible to leak of the sealed fluid and the backup ring 106 is intended for preventing such leak of the sealed fluid. Therefore the backup ring 106 is disposed between the first seal lip 101 and the second seal lip 108, being responsible for a full load exerted from the external environment side. When the first seal lip 101, the second seal lip 108 and the backup ring 106 are pressed against the rotary shaft 113 due to the pressure of the sealed fluid, this will increase a possibility of rapid abrasion of the rotary shaft 113. The sealed fluid also tends to include various kinds of impurities during its operation as action fluid. The impurities included in the sealed fluid are caught on the seal faces of the respective seal lips 101, 108 which come to a contact with the rotary shaft 113. Also a particular composition contained in the sealed fluid may be solidified due to friction heat, which is deposited on the seal faces of the respective seal lips 101, 108 and causes abrasion of opposing slide faces.

However, the backup ring 106 in the form of thin sheet metal does not have enough strength to be able to keep the first seal lip 101 in tight contact under a small area pressure with the rotary shaft 113. While the first seal portion 104A is urged to press against the rotary shaft 113 strongly by the pressure of the sealed fluid, the backup ring 106 is urged to press against the rotary shaft 113 as well by the sealed fluid. This implies that the seal portion 104A and the backup ring 106 will be worn through sliding against the rotary shaft 113. Further, the entire seal face of the second seal face 108 having a tight contact with the rotary shaft 113 is subject to abrasion over wide areas. In a particular case that the sealed fluid is used under a high pressure, the first seal lip 101 and the second seal lip 108 are heavily urged against the rotary shaft 113 by the sealed fluid so that the respective, relative slide faces will undergo substantial abrasion. If impurities included in the sealed fluid are deposited on the seal face, abrasion of the seal face will progress even faster. Such abrasion of the respective slide faces will deteriorate seal performance of the shaft seal device 100. Although the shaft seal device 100 is configured replaceable for a replacement due to abrasion, the rotary shaft 130 is hard to be replaced because of its elongated form as well as its integral structure with the apparatus.

The present invention is introduced to alleviate the above mentioned problems. A primary technical goal which this invention tries to achieve is to protect the slide faces of the seal lips in a shaft seal device from abrasion caused by impurities included in a sealed fluid or a kind of sealed fluid which is solidified through chemical reaction due to friction heat, and to enhance seal performance of the shaft seal device by preventing abrasion of the surface of a rotary shaft which slides relative to the seal lips. Another goal is to improve durability of the rotary shaft and to reduce a replacement cost of the rotary shaft by preventing abrasion thereof.

DISCLOSURE OF THE INVENTION

A primary object of the present invention is to alleviate the above mentioned technical disadvantages, and a solution to such disadvantages is embodied as follows.

A shaft seal device related with the present invention is a shaft seal device for sealing a sealed fluid between a bore of a housing member and a rotary shaft disposed within the bore surface. The shaft seal device comprises a seal portion and a seal sleeve wherein the seal portion comprises a close-fit engagement portion and a first seal lip in which the close-fit engagement portion has a fit engagement surface and the fit engagement surface is capable of having a tight-fit engagement with the bore surface of the housing member, in which the first seal lip is made of a rubber resilient material and extends radially inward from the close-fit engagement portion and has a seal face, in which the seal face seals the sealed fluid in the inner circumference of the close-fit engagement portion, wherein a seal sleeve comprises a slide seal face, a rotary wing, and tight-fit engagement surface in which the slide seal face is slidably in a seal-tight contact with the seal face of the first seal lip, in which the rotary wing is structured so as to cover the seal face region in a recess space from the axial end portion of the slide seal face, in which the seal sleeve is made of a metal or resin material, wherein the rotary wing disposes a discharge means so as to push back the sealed fluid which attempts to flow into the seal face region.

According to the shaft seal device related to the present invention, the seal sleeve closely fits the rotary shaft in freely detachable a manner and the slide seal face is structured so as to seal the sealed fluid by forming a seal-tight contact with the seal face of the seal portion. And since there is disposed a discharge means on the rotary wing of the seal sleeve wherein the rotary wing surrounds the seal face region in a recess form and the discharge means pushes back the sealed fluid in the direction of departing from the seal faces, the sealed fluid is pushed back in a direction of impurities included in the sealed fluid departing from the seal faces. This can prevent the impurities in the sealed fluid from getting caught on the seal faces. Furthermore, as the rotary wing in cooperation with the discharge means disposed on the seal sleeve stirs the sealed fluid, heating of the seal faces due to friction heat is prevented and a sealed fluid such as a chemical fluid or the like is prevented from getting solidified and caught on the seal faces due to heat. Therefore, durability with wear protection as well as seal performance of the seal faces are enhanced.

BEST MODE FOR CARRYING OUT THE INVENTION

Described below is details of the figures of preferred embodiments of the present invention according to actual design drawings with accurate dimensional relations.

Embodiment 1

Figure 1:
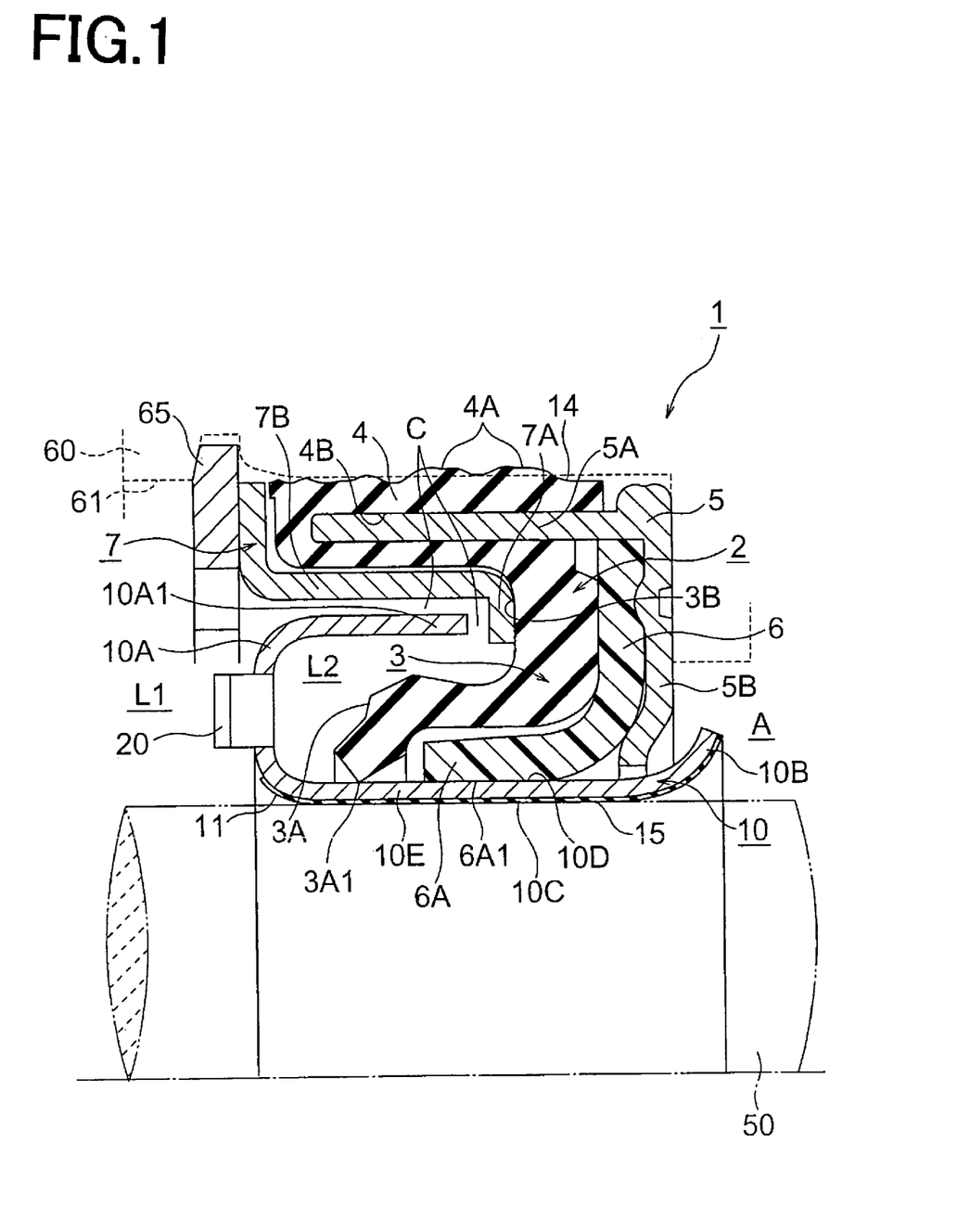
FIG. 1 is a cross sectional view of a half portion of the shaft seal device related to the embodiment 1.
Figure 2A:
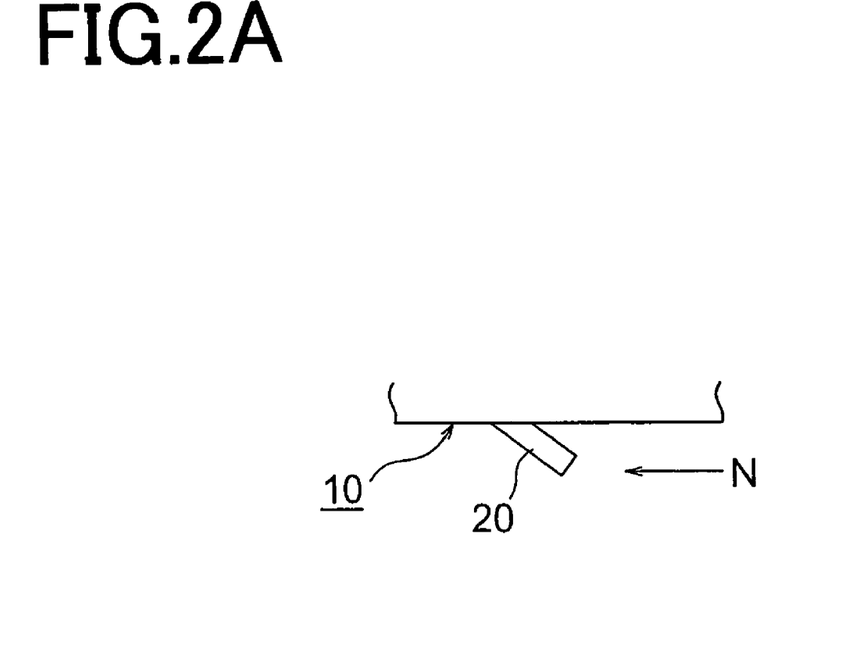
FIG. 2A is a side view of a portion of a discharge means in the shaft seal device shown in FIG. 1.
Figure 2B:
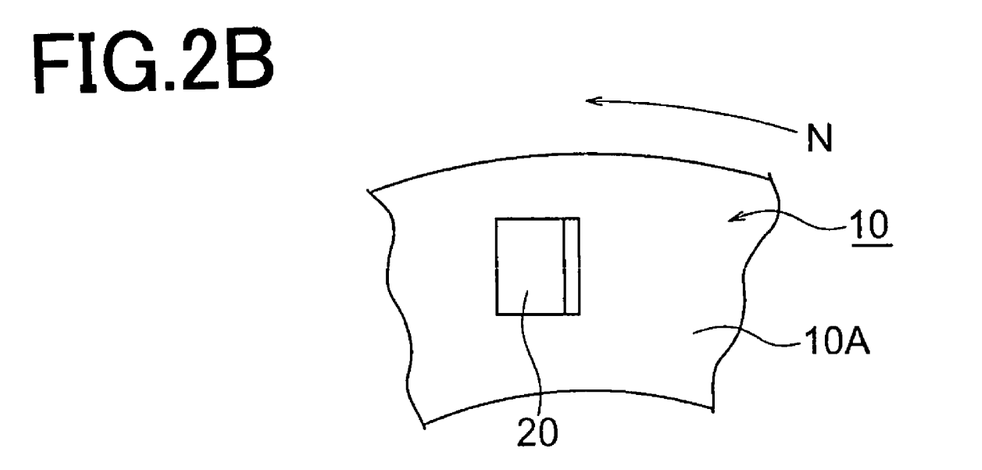
FIG. 2B is a front view of a portion of a discharge means in the shaft seal device shown in FIG. 1.

First, a shaft seal device of the embodiment 1 related to the present invention will be described. FIG. 1 shows a cross sectional view of a half portion of a shaft seal device 1. In FIG. 1, a rotary shaft 50 is mounted in a bearing bore 61 in a housing 60. A seal sleeve 10 fitted to the rotary shaft 50 is fabricated in a cylindrical form out of a stainless steel sheet. Both ends of a cylindrical portion 10E of the seal sleeve 10 are bent radially outward. A rotary wing 10A which is inflected at one end of the cylindrical portion 10E is structured so as to form an L-shape cross section from the end and to have a U-shape cross section in its entirety including the end portion so that a seal face 3A1 of an annular lip member 3A can be inserted thereinto. A region defined within the rotary wing 10A of U-shape design is referred to as a seal face region L2. As shown in FIG. 2A and FIG. 2B, there is disposed a discharge means 20 on the radially extending side wall of the rotary wing 10A wherein the discharge means 20 is built like a fin by inflecting a portion of the rotary wing 10A. The portion of the rotary wing 10A is cut out and bent like a tilted fin in order to define the discharge means 20. The discharge means 20 consists of a plurality of such pieces built on the radially extending side wall. The seal sleeve 10 is to rotate in a direction indicated by N. The discharge means 20, not shown, may alternatively fabricated by means of a drawing process applied to a portion of the rotary wing 10A in order to form protrusions. The discharge means 20 can take a variety of design forms as long as it operates to push the sealed fluid L1 away from the first seal face 3A1.

Outer circumference side of the rotary wing 10A defines a partitioning portion 10A1 which is of a cylindrical design. And the other end of the cylindrical portion 10E defines a stopper 10B whose cross section is of circular arc form. The circular arc of this stopper 10B is arranged small so that it is fabricated by bending after the assembly of the seal portion 2 and the seal sleeve 10 is completed. The stopper 10B can be arranged to have a plurality of axially extending slots along the circumferential surface, which makes the bending of the stopper 10B easier. It is preferable that a thin layer coating of a cylindrically designed seal ring 11 be applied to an inner circumferential fit surface 10C in its entirety of the cylindrical portion 10E of the seal sleeve 10. Then the inner diameter surface of the seal ring 11 is defined as a tight fit engagement face 15 which fits the rotary shaft 50. This tight fit engagement face 15 provides a seal such that the sealed fluid L1 does not leak to the external environment A from between the rotary shaft 50 and the inner circumferential fit surface 10C. The inner circumferential fit surface 10C may alternatively be configured such that the tight fit engagement face 15 is directly engaged with the rotary shaft 50 by omitting the seal ring 11. In particular, in case when the seal sleeve 10 is made of resin material, a direct fit engagement of the inner circumferential fit surface 10C with the rotary shaft 50 as the tight fit engagement face 15 of the seal sleeve 10 can provide a seal between the seal sleeve 10 and the rotary shaft 50.

On the circumference of the cylindrical portion 10E of the seal sleeve 10 defines a slide seal face 10D. The slide seal face 10D as rolling mill finished steel sheet is smooth enough to achieve a low friction slide relative to the seal face 3A1. Also a machining cost for polishing the slide seal face 10D in the cylindrical form can be reduced because of its short axial dimension. It is alternatively possible to apply a coating of tetrafluoroethylene resin or rubber to the outer circumferential surface of the metal seal sleeve 10, which defines a slide seal surface 10D. Other than stainless steel, a material used for the seal sleeve 10 can be steel, brass, resin, composite material of, for example, acetal or polyamide or the like.

A seal portion 2 consists of a close-fit engagement portion 4 and a first seal lip 3 which are made of a rubber material. The close-fit engagement portion 4 is configured in a cylindrical form. The close-fit engagement portion 4 defines a fit engagement face 14 which fits with the bore face (also referred to a bore) 61 of housing 60, wherein a seal projection member 4A disposed on the fit engagement face 14 comes to make a tight contact with the mating bore 61 for sealing the sealed fluid L1. On the opposite side wall of the close-fit engagement portion 4 with respect to the sealed fluid L1, there is disposed an engagement recess portion 4B which is a deep, annular groove extending in the axial direction. Then the first seal lip 3 is disposed in the inner circumferential side relative to the close-fit engagement portion 4. The first seal lip 3 has a tubular form protruding to the direction of the sealed fluid L1. There is disposed an annular lip member 3A at the distal end of the first seal lip 3. The annular lip member 3A defines the first seal face 3A1 which comes to a tight-fit engagement with the slide seal face 10D of the seal sleeve 10. The first seal face 3A1 retains a sharp square corner in cross section which undergoes elastic deformation to make a tight, small area contact with the slide seal face 10D of the seal sleeve 10 for sealing the sealed fluid L1. Also the sealed fluid L1 side of the proximal portion of the first seal lip 3 defines a support surface 3B. In addition, a reinforcement ring 5 is fittingly mated with the rubber-elastic close-fit engagement portion 4 in the seal portion 2. This reinforcement ring 5 provides a reinforcement so that the close-fit engagement portion 4 does not resiliently yield after the engagement of the close-fit engagement portion 4 to the housing 60.

The reinforcement ring 5 is shaped like a bottomed cylinder with bore, consisting of a reinforcement portion 5A in a cylindrical form and a retainer portion 5B corresponding to the bottom portion. The reinforcement portion 5A of the reinforcement ring 5 engages with the engagement recess portion 4B in freely detachable a manner. The retainer portion 5B provides a support to the hind side of the first seal sleeve 3. Furthermore, there is disposed a resin-made second seal lip 6 in parallel to the first seal lip 3 in the inner circumferential side of the close-fit engagement portion 4. The second seal lip 6 has an arcuate L-shaped cross section, defining a tubular lip portion 6A in its inner circumferential side. The tubular lip portion 6A retains the seal sleeve 10 by fitting the slide seal face 10D. Outmost root portion of the second seal lip 6 is securely sandwiched near the root portion of the first seal lip 3 between an urging portion 7A of a support ring 7 and the retainer portion 5B. Inner circumference of the tubular lip portion 6A defines a second seal face 6A1 which seals the sealed fluid L1 by forming a tight contact with the slide seal face 10D of the seal sleeve 10.

The support ring 7 which is made of metal consists of a cylindrical portion 7B of L-shaped cross section and an urging portion 7A which is disposed at the end portion of the cylindrical portion 7B. While the retainer portion 5B of the reinforcement ring 5 comes to rest with the hind side surface of the second seal lip 6 to provide a support, the urging portion 7A of the support ring 7 comes to rest with the support surface 3B of the first seal lip 3 and therefore the first seal lip 3 and the second seal lip 6 are securely clamped therebetween. The inner diameter surface of the cylindrical portion 7B of the support ring 7 comes in a loose fit engagement with the partitioning portion 10A1 of the rotary wing 10A under a small clearance gap C. A distal end face of the partitioning portion 10A1 also comes to close proximity to the urging portion 7A of the support ring 7, defining a clearance gap C which makes resistance to the sealed fluid L1 attempting to break into a seal face region L2. The respective clearance gaps C should be constructed small enough so that, when the rotary wing 10A rotates, the clearance gap C in cooperation with the inner diameter surface of the cylindrical portion 7B is able to stir the sealed fluid L1. The seal sleeve 10 fitted with the rotary shaft 50 can be replaced after worn-out because it is a distinct member from the rotary shaft 50. The reinforcement ring 5 is also replaceable because it is detachable from the seal portion 2. The radially inmost portion therefore can be brought to close proximity to the seal sleeve 10 which is disposed in the outer circumference of the rotary shaft 50 and the seal sleeve 10 can be replaced even when a pressure of the sealed fluid L causes contact and wear of the seal sleeve 10, thus being able to provide a sufficient support to the hind surface of the cylindrical lip portion 6A of the second seal lip 3. This support ring 7 and the reinforcement ring 5 should be made of a material such as steel, stainless steel, brass, aluminum, resin or the like.

As described above, the seal portion 2 is comprised of rubber-made close-fit engagement portion 4, first seal lip 3, reinforcement ring 5, second seal lip 6 and support ring 7. This seal portion 2 is mounted by means of the reinforcement ring 5 which comes to rest with a step shoulder portion of the bore 61 in the housing 60. Also a snap ring 65 engages with the seal portion 2 in order to prevent the seal portion 2 from coming off the housing 60. Then the seal portion 2 and the seal sleeve 10 are assembled one another in such a manner that the first seal face 3A1 and the second seal face 6A1 are in seal-tight contact with the slide seal face 10D of the seal sleeve 10. The seal portion 2 and the seal sleeve 10 therefore are joined with each other via friction force due to tight-fit contact achieved therebetween. For example, even if an external force attempts to remove the seal sleeve 10 from the seal portion 2, the partitioning portion 10A1 of the rotary wing 10A will come to rest with the urging portion 7A of the support ring 7. For the opposite direction, the stopper 10B will come to rest with the retainer portion 5B. The seal sleeve 2 therefore can be prevented from coming off the seal portion 2. Also a shaft seal device 1 can be kept in storage as a pre-assembled state of the seal portion 2 and the seal sleeve 10. When the shaft seal device 1 is installed in machinery or facilities, the two elements are already joined with each other and therefore a problem such as a missing element will be unlikely.

The slide seal face 10D of the seal sleeve 10 has a rolling-mill finished, smooth surface or resin mold surface, therefore requiring no additional finish for the slide seal face 10D. Also a friction coefficient of the slide seal face 10D can be reduced by applying a layer coating thereto such as coating a fluorocarbon resin or the like to the outer circumferential surface of the seal sleeve 10. Further, the first seal face 3A1 of the annular lip member 3A is protected by a cover provided by the rotary wing 10A from a possible damage caused by colliding with other members.

Embodiment 2

Figure 3:
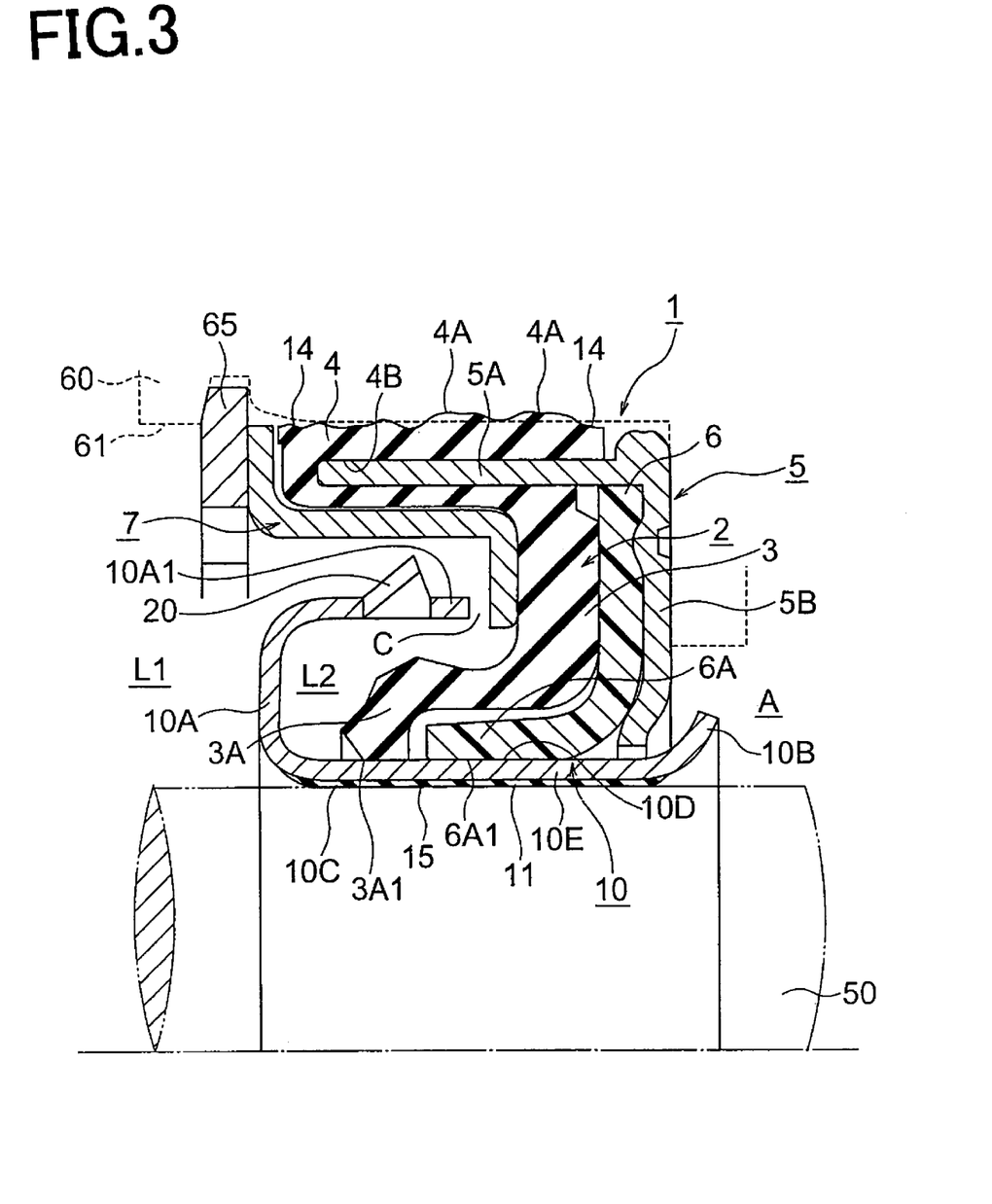
FIG. 3 is a cross sectional view of a half portion of the shaft seal device 1 related to the embodiment 2.
Figure 4:
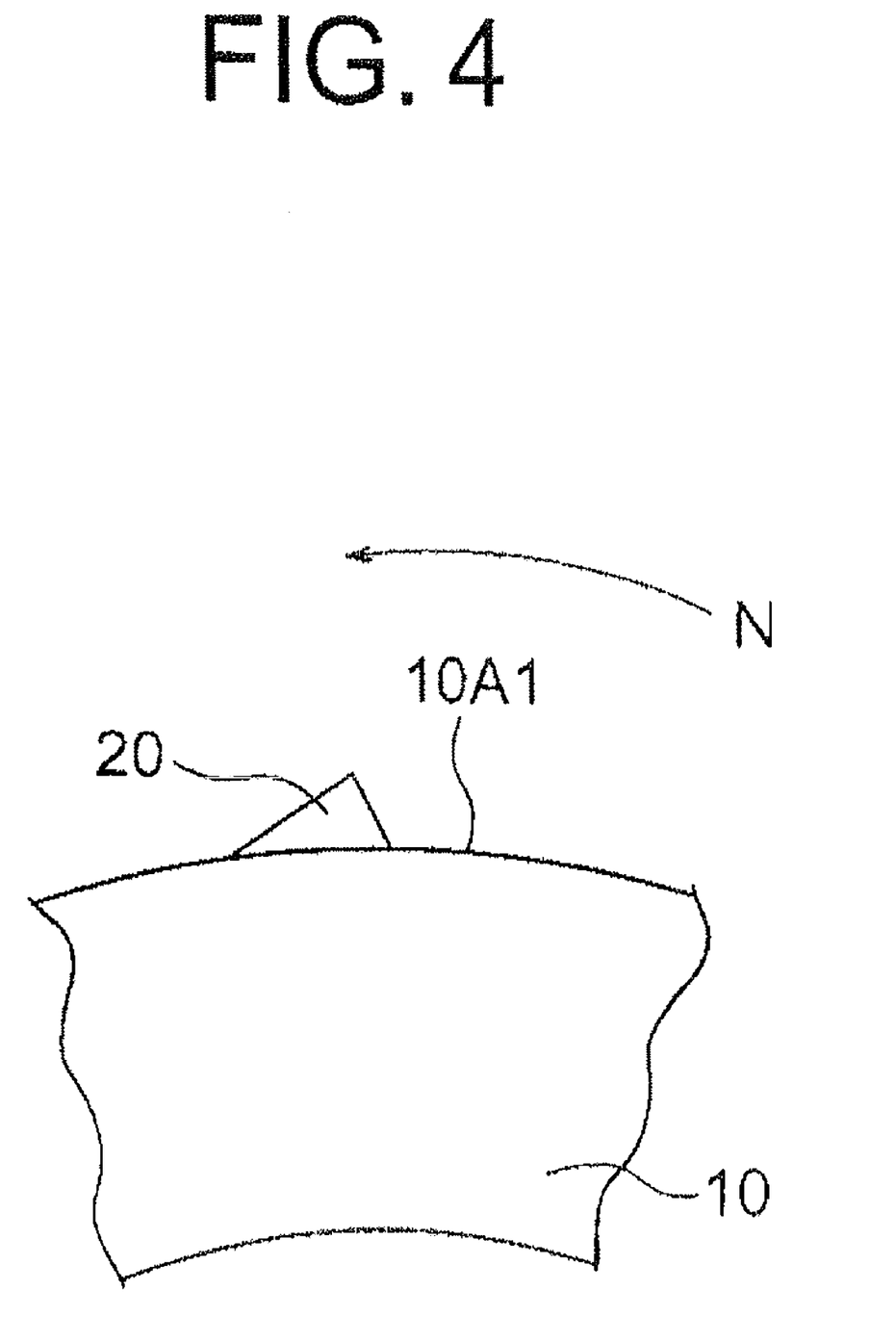
FIG. 4 is a front view of a portion of a discharge means in the shaft seal device shown in FIG. 3.

Next, a shaft seal device 1 of the embodiment 2 related to the present invention will be described. FIG. 3 is a cross sectional view of a half portion of the shaft seal device 1 related to the embodiment 2. What makes FIG. 3 different from FIG. 1 is that there is disposed a discharge means 20 on the diameter surface of the partitioning portion 10A1 of the rotary wing 10A. The discharge means 20, as shown in FIG. 4, is fabricated by inflecting a portion of the partitioning portion 10A1 along the circumferential surface of the partitioning portion 10A1 to give a fin-like shape. A plurality of fins are provided along the circumferential surface of the partitioning portion 10A1. The discharge means 20 can alternatively be fabricated by means of deep drawing applied to a portion of the partitioning portion 10A1 in order to form fin-shaped projections. Multiple rows of discharge means 20, 2 to 3 rows aligned in the axial direction, can be constructed on the periphery surface of the partitioning portion 10A1. The seal sleeve 10 rotates in the direction of "N". As for other arrangements in the embodiment 2, members designated by the same reference numerals in FIG. 1 imply more or less the same members in FIG. 1.

Figure 5:
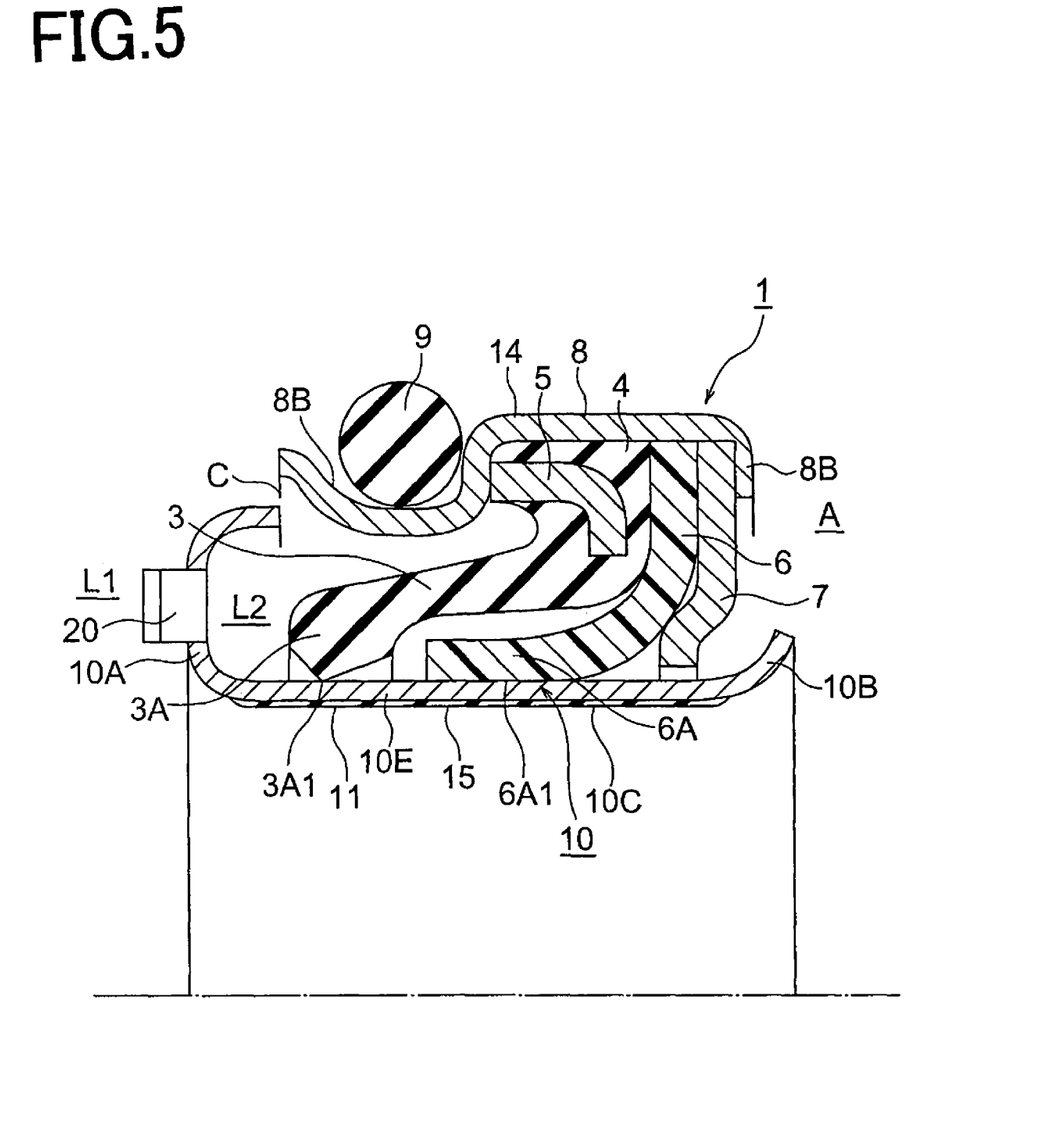
FIG. 5 is a cross sectional view of a half portion of the shaft seal device related to the embodiment 3.

Next, a shaft seal device 1 of the embodiment 3 related to the present invention will be described. FIG. 5 is a cross sectional view of a half portion of the shaft seal device 1 related to the embodiment 3. What makes FIG. 5 different from FIG. 1 is that, instead of the reinforcement ring 5 having a fit engagement with the close-fit engagement portion 4, the reinforcement ring 5 is immersed in the close-fit engagement portion 4. The reinforcement ring 5 immersed in the close-fit engagement portion 4 has an S-shaped cross section. Also the retaining portion 7 is in a ring plate form and disposed in parallel to the hind surface of the second seal lip 6. An outer annular member 8 then retains the outer circumferential portion of the second seal lip 6 and the retaining portion 7 as well as the close-fit engagement portion 4 in order to form an integral structure. This integral structure is obtained by inflecting a clinching portion 8B at the end portion of the outer annular member 8 in order to secure the close-fit engagement portion 4, the second seal lip 6 and the reinforcement portion 7. And there is disposed a fit engagement surface 14 in the outer periphery of the outer annular member 8 which comes to a fit engagement with the close-fit engagement portion 4. In addition, the outer annular member 8 defines a groove portion 8B in sealed fluid L1 side thereof in order to receive O-ring 9 thereto, and the O-ring 9 provides a seal between the fit engagement surface 14 and the bore 61 (refer to 61 in FIG. 1) of the housing with which the fit engagement surface 14 comes to a close-fit engagement.

Furthermore, there is disposed a seal ring 11 in a sheet form on the inner circumferential surface of the seal sleeve 11 wherein the seal ring 11 is thicker than that in FIG. 1. The inner diameter surface of the seal ring 11 defines seal-tight fit engagement surface 15. Also the axial length of the partitioning portion 10A1 (refer to FIG. 1) in the rotary wing 10A is constructed smaller than that in FIG. 1. End portion of the partitioning portion 10A1 is brought in close proximity to the distal end of the outer annular member 8, forming a clearance gap C therebetween. The discharge means 20 is arranged in the same form as in FIG. 1. Other arrangements are the same as the shaft seal device 1 in FIG. 1.

The present invention thus constructed is effective in that the discharge means 20 prevents impurities included in a sealed fluid L1 from flowing in together with the sealed fluid L1, being caught on the seal faces and causing wear of the respective seal faces 3A1, 6A1. In particular, as the discharge means 20 is disposed in the rotary wing 10A, a centrifugal force due to rotations of the rotary wing 10A will collect the impurities included in the sealed fluid L1 to a ring form, and the impurities are expelled by the discharge means 20 in the direction of departing from the first and second seal faces 3A1, 6A1, therefore preventing the impurities from getting caught on the first seal face 3A1 and the second seal face 6A1. Also the rotary wing 10A and the discharge means 20 will stir a sealed fluid L1 located in the seal face region L2 near the first seal face 3A1 and the second seal face 6A1, thereby preventing solidification of the sealed fluid L1 onto the first seal face 3A1 and the second seal face 6A1. The first seal face 3A1 and the second seal face 6A1 therefore exhibit outstanding seal performance.

Described below is respective inventions of preferred examples related to the present invention A shaft seal device as an invention of the second preferred embodiment related to the present invention is a shaft seal device wherein, in the seal portion, the annular lip member in the inner circumference of the first seal lip is laid along more or less axial direction inside a recess area of the rotary wing and the shaft seal device further comprises a second seal lip which is made of a resin material wherein the second seal lip is disposed in parallel to the hind surface of the first seal lip and the outer circumference of the second seal lip is retained by the close-fit engagement portion, wherein an inner circumferential tubular lip portion of the second seal lip is disposed radially inside of the annular lip member and comes to a tight-fit engagement with the slide seal face.

According to the shaft seal device related to the invention of the second embodiment, disposition of the second seal lip consisting of an annular lip member of almost cylindrical design and a resin-made tubular lip portion is expected to bring an effect that a rotation of the annular lip member and the tubular lip portion in cooperation with the rotary wing will expel a sealed fluid as well as impurities included in the sealed fluid from the seal face region, not allowing the impurities caught on the respective seal faces. Abrasion is therefore prevented in the respective seal faces of the first seal lip which is made of a rubber resilient material and the second seal lip which is made of a resin material and a great seal performance is thereby exhibited. Moreover, although a heat generated due to slide friction reduces seal performance of the respective seal faces of the rubber-made first seal lip made of a rubber resilient material and the second seal lip made of a resin material, the rotation of the annular lip member and the tubular lip portion in cooperation with the rotary wing will create a stir in the sealed fluid, thereby decreasing the temperature of the heated seal faces. The seal faces thus retain its elasticity and exhibit outstanding seal performance. A solidification of the sealed fluid on the seal faces caused by the slide friction heat can also be prevented.

A shaft seal device as an invention of the third preferred embodiment related to the present invention is a shaft seal device wherein a rotary wing is inflected so as to form an L-shape from the end portion to the axial direction toward the annular lip member and a discharge means is disposed on the radially defined side wall of the rotary wing in order to push back the sealed fluid from breaking into the seal region defined within the rotary wing.

According to the shaft seal device related to the invention of the third embodiment, the rotary wing is constructed to define an L-shape which starts from the end portion of the slide seal face (cylindrical portion) of the seal sleeve and axially extends toward the annular lip member wherein the rotary wing disposes a discharge means on the radially defined side wall of the rotary wing in order to push back the sealed fluid from breaking into the seal region defined within the rotary wing. The discharge means therefore can effectively push back impurities included in the sealed fluid in the direction of departing from the seal faces, thus preventing the impurities from getting caught on the seal faces and enhancing the seal performance of the seal faces for sealing the sealed fluid.

A shaft seal device as an invention of the fourth preferred embodiment related to the present invention is a shaft seal device wherein the outer circumferential surface or distal end portion of the rotary wing is configured to oppose to a cylindrical support ring disposed in the seal portion so as to define a certain clearance gap between the outer circumferential surface or distal end portion and the support ring so that the sealed fluid is stirred for circulation.

According to the shaft seal device related to the invention of the fourth embodiment, as the outer circumferential surface or distal end portion of the rotary wing is configured to oppose to a cylindrical support ring disposed in the seal portion so as to define a clearance gap (a gap enough to allow the sealed fluid to be stirred and circulate), the sealed fluid located within the gap is stirred and the rotation of the rotary wing in cooperation with the discharge means prevents impurities included in the sealed fluid from breaking into the seal face region through the clearance gap. This also effectively prevents the impurities from causing abrasion of the seal faces. In particular, because the sealed fluid is stirred by means of the outer circumferential surface of the rotary wing which increases the pressure and the sealed fluid is restrained by the clearance gap wherein the end portion is opposed to the support ring, the sealed fluid develops a flow in the direction of departing from the seal faces, therefore preventing the impurities from causing abrasion of the seal faces.

A shaft seal device as an invention of the fifth preferred embodiment related to the present invention is a shaft seal device wherein the outer circumferential surface of the rotary wing is defined as a partitioning portion of cylindrical design and a discharge means is disposed on the partitioning portion in order to push back the sealed fluid from flowing into the seal face region.

According to the shaft seal device related to the invention of the fifth embodiment, as the circumferential surface of the rotary wing is defined as a partitioning portion and the discharge means is disposed on the partitioning portion in order to push back the sealed fluid out of the seal face region, the rotations of the discharge means disposed on the partitioning portion as well as the partitioning portion of the rotary wing can effectively push back the impurities included in the sealed fluid which try to break into the seal face region from the partitioning portion side of the rotary wing. Also abrasion of the seal faces due to the impurities getting caught on the seal faces is prevented.

INDUSTRIAL APPLICABILITY

As described above, a shaft seal device related to the present invention is advantageous for effecting a seal against impurities included in a sealed fluid or against a sealed fluid prone to solidification by a slide friction heat. It is further advantageous for no polish requirement to the outer circumferential surface of the rotary shaft and prevention of wear or damage to the relative slide faces due to a slide movement of the seal lips. It is yet further advantageous for reducing a cost of the apparatus or facility utilizing the shaft seal device because of its applicability regardless of material or machining precision of the rotary shaft.

The invention claimed is:

1. A shaft seal device for sealing a sealed fluid between a bore surface of a housing member and a rotary shaft disposed within the bore surface, said shaft seal device comprising:
   a seal portion comprising a close-fit engagement portion and a first seal lip;
   said close-fit engagement portion having a fit engagement surface;
   said fit engagement surface being capable of having a tight-fit engagement with said bore surface of said housing member;
   said first seal lip being made of a rubber resilient material and extending radially inward from said close-fit engagement portion and having a seal face;
   said seal face sealing the sealed fluid in an inner circumference of said close-fit engagement portion; and
   a seal sleeve comprising a slide seal face, a rotary wing, and a tight-fit engagement surface;
   said slide seal face being slidably in a seal-tight contact with said seal face of said first seal lip;
   said rotary wing being formed from an axial end portion of said slide seal face, fixed on said rotary shaft and covering a seal face region;
   said seal sleeve being made of a metal or resin material;
   wherein said rotary wing comprises a discharge port formed as a fin on said rotary wing and extending away from said seal face region, and disposed intermediate free ends of said rotary wing, wherein said discharge port pushes back said sealed fluid from said seal face region, and a gap is formed between a support ring or an outer ring supporting said seal lip and said rotary wing.

2. The shaft seal device according to claim 1, wherein said seal portion comprises an annular lip member formed on an inner circumference of said first seal lip in and which extends in an approximately axial direction of the rotary shaft within a recess space of defined by said rotary wing, and wherein said seal portion further comprises a second seal lip;
   wherein said second seal lip is made of a resin material and is disposed in parallel to said first seal lip;
   wherein an outer periphery of said second seal lip is retained by said close-fit engagement portion; and
   wherein said second seal lip comprises a tubular lip portion formed at a free end of said second seal lip and arranged at an inner circumference side of said annular lip member and fitting with said slide seal face.

3. The shaft seal device according to claim 1, wherein said rotary wing is inflected to form an U-shape from the end portion of said slide seal face toward said first seal lip and said discharge port is defined in a side wall of said rotary wing.

4. The shaft seal device according to claim 3, wherein said seal portion comprises a cylindrical support ring or an outer ring, wherein an outer circumferential surface or distal end portion of said rotary wing is configured to oppose the cylindrical support ring or the outer ring disposed in said seal portion to define the said rotary wing and said support ring or outer ring so that said sealed fluid is stirred for circulation.

5. The shaft seal device according to claim 3, wherein said rotary wing comprises a partitioning portion of cylindrical design defining an outer circumferential surface of said rotary wing and said discharge port is disposed on said partitioning portion.

* * * * *